United States Patent [19]

Kiedaisch et al.

[11] Patent Number: 5,361,715

[45] Date of Patent: Nov. 8, 1994

[54] MARINE DOCK FENDER CONTACT SURFACE ATTACHING BOSS

[75] Inventors: Edward Kiedaisch, Keokuk; David L. Walljasper, Donnellson, both of Iowa

[73] Assignee: Svedala Industries, Inc., Waukesha, Wis.

[21] Appl. No.: 71,754

[22] Filed: Jun. 9, 1993

[51] Int. Cl.$^5$ ............................................. B63B 59/02
[52] U.S. Cl. ................................... 114/219; 405/212; 267/140
[58] Field of Search ............. 114/219, 74 A; 405/212, 405/215; 267/139, 140

[56] References Cited

U.S. PATENT DOCUMENTS

| | | | |
|---|---|---|---|
| 2,027,800 | 1/1934 | Whitlock. | |
| 2,926,904 | 3/1960 | Erlbacher | 267/140 |
| 3,014,710 | 2/1960 | Layne | 262/140 |
| 3,495,732 | 2/1970 | Clarke et al. | 114/74 A |
| 3,539,173 | 5/1970 | Sampson | 267/140 |
| 3,664,075 | 5/1972 | Hazelwood et al. | 267/140 |
| 4,679,517 | 7/1987 | Kramer | 114/219 |
| 4,854,258 | 8/1989 | Hausmann et al. | 114/219 |

FOREIGN PATENT DOCUMENTS 3316359  12/1983  Germany ......................... 114/74 A

OTHER PUBLICATIONS

Brochure—*Trellex Fender Systems.*

*Primary Examiner*—Jesus D. Sotelo
*Attorney, Agent, or Firm*—Kinney & Lange

[57] ABSTRACT

A fender for absorbing the impact between converging bodies includes a supporting surface, a plurality of bosses and an energy absorbing member. The plurality of bosses protrude from the supporting surface at spaced locations. Each boss has an outer perimeter. The energy absorbing member surrounds the outer perimeter of each boss so that each boss absorbs vertical and horizontal shear forces within the energy absorbing member.

20 Claims, 4 Drawing Sheets

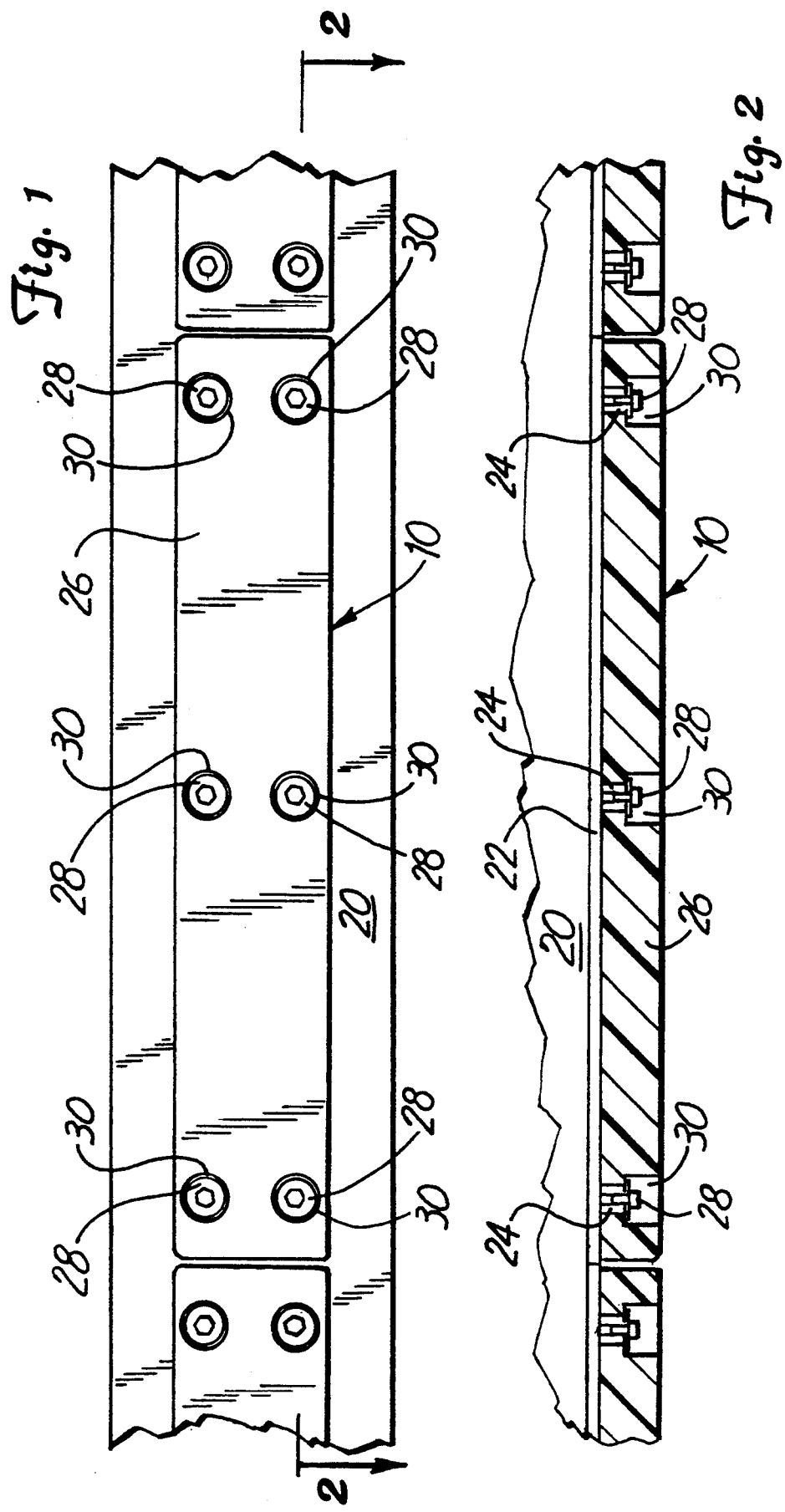

MARINE DOCK FENDER CONTACT SURFACE ATTACHING BOSS

BACKGROUND OF THE INVENTION

This invention relates to fenders or bumpers having elastomeric resilient means such as rubber or polyethylene, which are used to fend or prevent excessive shock on bumping, collision or contact of two bodies, such as between a truck and a loading dock, a boat and a pier or wharf, a towboat and a barge, or other moving or converging bodies, the fenders being attached to one or both of the bodies. In particular, the invention relates to bumpers or fenders for absorbing shearing forces induced into marine fender/vessel contact surfaces rather than having the forces imposed on the contact surface attaching hardware.

Shearing forces are the sum of forces caused by friction, direct engagement by hull projection and cold flow caused by high contact pressure. These shearing forces occur both vertically and horizontally. When two bodies converge together, the shearing forces created may damage the contact surfaces of either of the converging bodies.

To prevent damage to either of the converging bodies, fenders or bumpers have been used to absorb the shearing forces induced in the contact surfaces. Typically, these fenders have been attached to the supporting structure by either bolts threaded into tapped holes in the supporting structure or nuts screwed into studs welded onto the support structure.

However, several drawbacks are associated with these fenders. Tapped holes in the supporting structure create points for stress concentrations and corrosion. This often leads to damage to the supporting structure. In addition, the smaller cross-sectional area of the bolts or studs cannot sufficiently absorb the shearing forces. Consequently, the fender may be sheared off at the support structure under high shear loads. Moreover, the smaller diameter of the bolts or studs causes the fender contact surface surrounding the bolts or studs to deform around the bolts or studs under high shear loads. At times, deformation may be large enough to cause the fender to become unattached from the supporting structure.

Another type of fender which has been commonly used is a bumper which includes parallel bars or rails which are welded to the supporting surface. These bars typically have tapped holes into which bolts are threaded. With these fenders, the bumper pad or elastomeric material has a portion which is captured between the head of the bolt and the rail or bar. Because the fender rails run continuously in one direction, the rails absorb shear forces and prevent movement in only one direction, perpendicular to the rails. Because only the bolts themselves pass through the bumper pads or the elastomeric fender material, the bolts must absorb all the shear forces in the direction parallel to the rails. Consequently, these fenders require very high strength bolts.

Another drawback to this type of fender is that all the forces are concentrated at the rails. As a result, the rails may become deformed or may become unattached from the supporting surface.

SUMMARY OF THE INVENTION

The present invention is a fender for absorbing shearing forces induced into marine fender/vessel contact surfaces rather than having the forces imposed on the contact surface attaching hardware. The fender includes a supporting surface, a plurality of bosses, and a resilient bumper. The plurality of bosses protrude from the supporting surface. The resilient bumper surrounds an outer perimeter of each one of the bosses so that each one of the bosses absorbs vertical and horizontal shear forces within the bumper.

BRIEF DESCRIPTION OF THE DRAWINGS

FIG. 1 is a side elevational view of a fender of the present invention secured to a base.

FIG. 2 is a sectional view of the fender of FIG. 1 taken along lines 2—2.

DETAILED DESCRIPTION OF THE PREFERRED EMBODIMENTS

Figure 3:
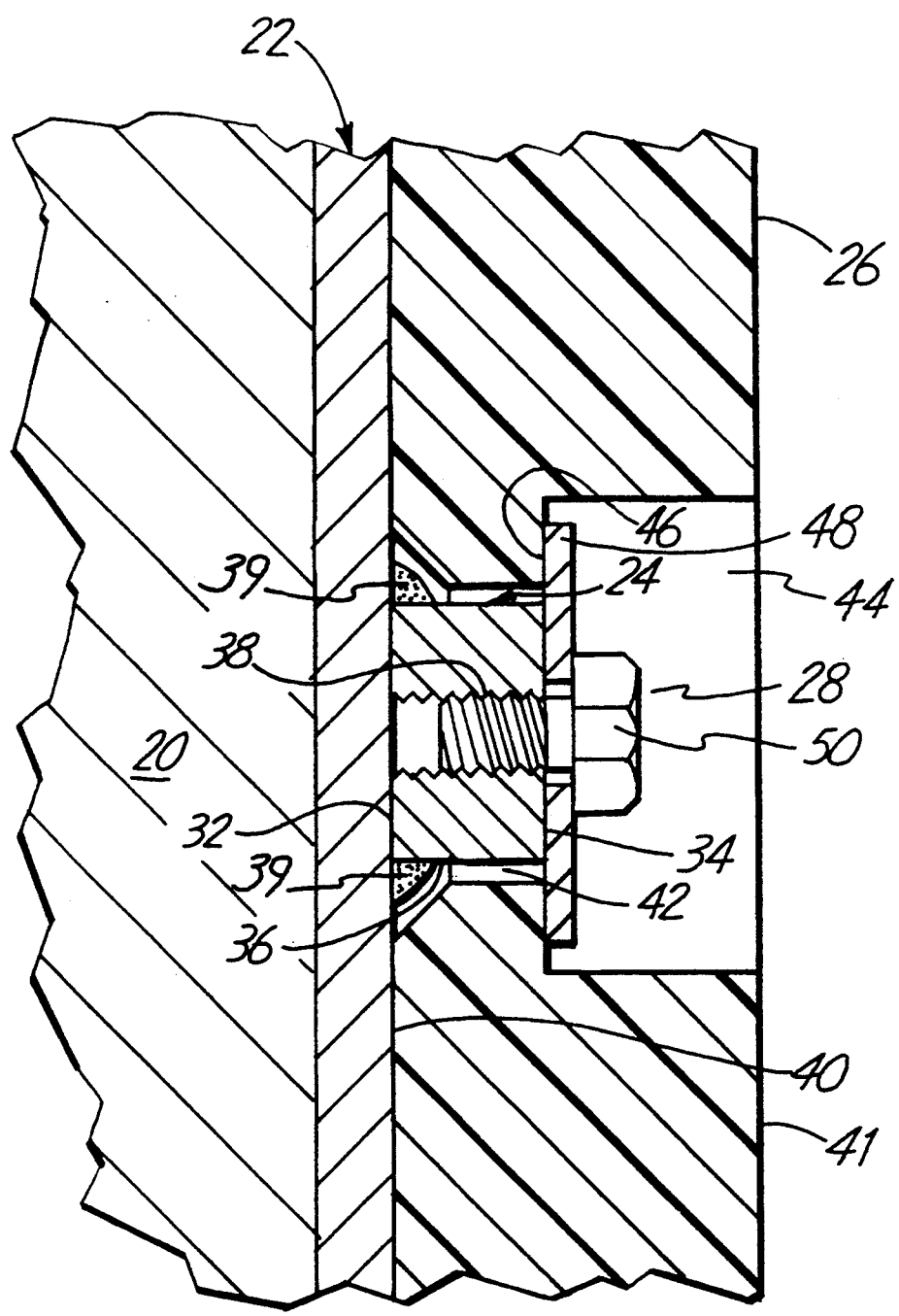
FIG. 3 is a sectional view of a portion of the fender of FIG. 1 showing a single bumper attachment.

FIGS. 1 and 2 show a fender 10 secured to a base 20 such as the side of a vessel, dock, etc. FIG. 1 shows a side elevational view of fender 10. FIG. 2 shows a sectional view of fender 10 taken along line 2—2 of FIG. 1. Fender 10 includes back plate 22, a plurality of bosses 24, resilient bumper 26, and a plurality of bumper attachments 28.

Back plate 22 is generally secured to a supporting surface of base 20 which may be the side of a vessel, dock, etc. Back plate 22 provides a support structure to which fender 10 is mounted to base 20. Alternatively, back plate 22 may concurrently serve as a base. Back plate 22 is preferably constructed from steel or other metal material.

Bosses 24 protrude from a front surface of back plate 22 at spaced positions along back plate 22. Each boss 24 can be sized independently of bumper attachment 28 to provide the most cost-effective sizing of each. Bosses 24 are typically constructed from steel. However, other materials, such as plastic, may also be used to form bosses 24.

Resilient bumper 26 includes a plurality of holes 30 at spaced positions. Bumper 26 is positioned so that the back surface of the bumper contacts the front surface of back plate 22 and so that bosses 24 are positioned in holes 30 and are surrounded by bumper 26. Preferably, resilient bumper 26 is constructed from a resilient material such as rubber. Bumper 26 absorbs energy from any colliding body to protect base 20 and to prevent damage to the colliding body.

Bumper attachments 28 are positioned within holes 30 and are attached to bosses 24. Bumper attachments 28 hold resilient bumper 26 in contact with back plate 22.

Because bosses 24 are surrounded by bumper 26, fender 10 absorbs both vertical and horizontal shear forces. As a result, bosses 24 provide omni-directional retention of fender 10. Bosses 24 prevent both perpendicular and parallel movement of bumper 26. In addition, because bosses 24 are positioned at spaced locations along fender 10, and because each boss 24 is surrounded by bumper 26, forces are distributed over a larger area. The array of bosses 24 resist horizontal and vertical shear movement of bumper 26. Moreover, because bosses 24 are distributed along fender 10, fender 10 uses less material and involves less welding than fender arrangements which employ continuous rails.

FIG. 3 is an enlarged sectional view of fender 10 showing a single bumper attachment 28 mounted to boss 24 and holding bumper 26 in contact with back plate 22. As best shown in FIG. 3, boss 24 includes a back side 32, a front side 34, a perimeter 36 and an internally threaded bore 38. Preferably, boss 24 is fixedly attached to back plate 22 by welds 39 which integrally weld back side 32 of boss 24 to a front surface of back plate 22. Alternatively, boss 24 may be integrally formed with back plate 22 or may be fixedly attached to back plate 22 by any other suitable attachment methods as are known in the art. Internally threaded bore 38 extends into boss 24 from front side 34 of boss 24.

Bumper 26 includes back surface 40, front surface 41, lower bore 42, upper bore 44 and shoulder 46. Lower bore 42 extends from back surface 40 of bumper 26 toward front surface 41 of bumper 26. Lower bore 42 has a depth approximately equal to the length of boss 24. Lower bore 42 has an inner diameter larger than perimeter 36 of boss 24. Toward back surface 40 of bumper 26, the diameter of lower bore 42 is flared outward to accommodate welds 39. Toward front surface 41 of bumper 26, the diameter of lower bore 42 widens to form shoulder 46 and upper bore 44.

Bumper 26 is positioned so that back surface 40 contacts the front surface of back plate 22. Boss 24 is positioned in lower bore 42 so that perimeter 36 of boss 24 is surrounded by bumper 26. Shoulder 46 provides a surface by which bumper 26 is held in contact with back plate 22. Upper bore 44 provides a countersink in which bumper attachment 28 can be positioned so as to hold bumper 26 against back plate 22 without bumper attachment 28 projecting out of upper bore 44. As a result, bumper 26 surrounds boss 24 and bumper attachment 28. Because boss 24 is surrounded by bumper 26, boss 24 absorbs both vertical and horizontal shear forces.

Bumper attachment 28 includes: retainer 48 and bolt 50. Retainer 48 has an outer diameter less than an inner diameter of upper bore 44 but greater than an inner diameter of lower bore 42. Retainer 48 also includes a hole through which bolt 50 extends. Preferably, retainer 48 comprises a metal washer.

Bolt 50 has a head with an outer diameter greater than an inner diameter of the hole of retainer 48. Bolt 50 has external threads for engaging the internal threads of internally threaded bore 38 of boss 24.

Bolt 50 and retainer 48 hold bumper 26 in contact with back plate 22. Retainer 48 is positioned within upper bore 44 so that retainer 48 contacts shoulder 46 of bumper 26. Bolt 50 is inserted through the hole in retainer 48 so that the head of bolt 50 engages retainer 48 to press retainer 48 against shoulder 46 of bumper 26. The external threads of bolt 50 engage internally threaded bore 38 of boss 24 to secure bolt 50 to boss 24 and to force retainer 48 against shoulder 46 of bumper 26. As a result, bumper 26 is held in contact against back plate 22.

Because boss 24 includes internally threaded bore 38 for engagement with bumper attachment 28, no holes are required in attaching surfaces of supporting structures. As a result, there are no holes within back plate 22 where there is the potential for stress concentrations and corrosion.

In addition, the diameter of boss 24 can be varied independent of the diameter of attaching hardware to increase contact area between bumper 26 and boss 24. Moreover, boss 24 can be sized independently of bumper attachment 28 to provide the most cost effective sizing of each.

Figure 4:
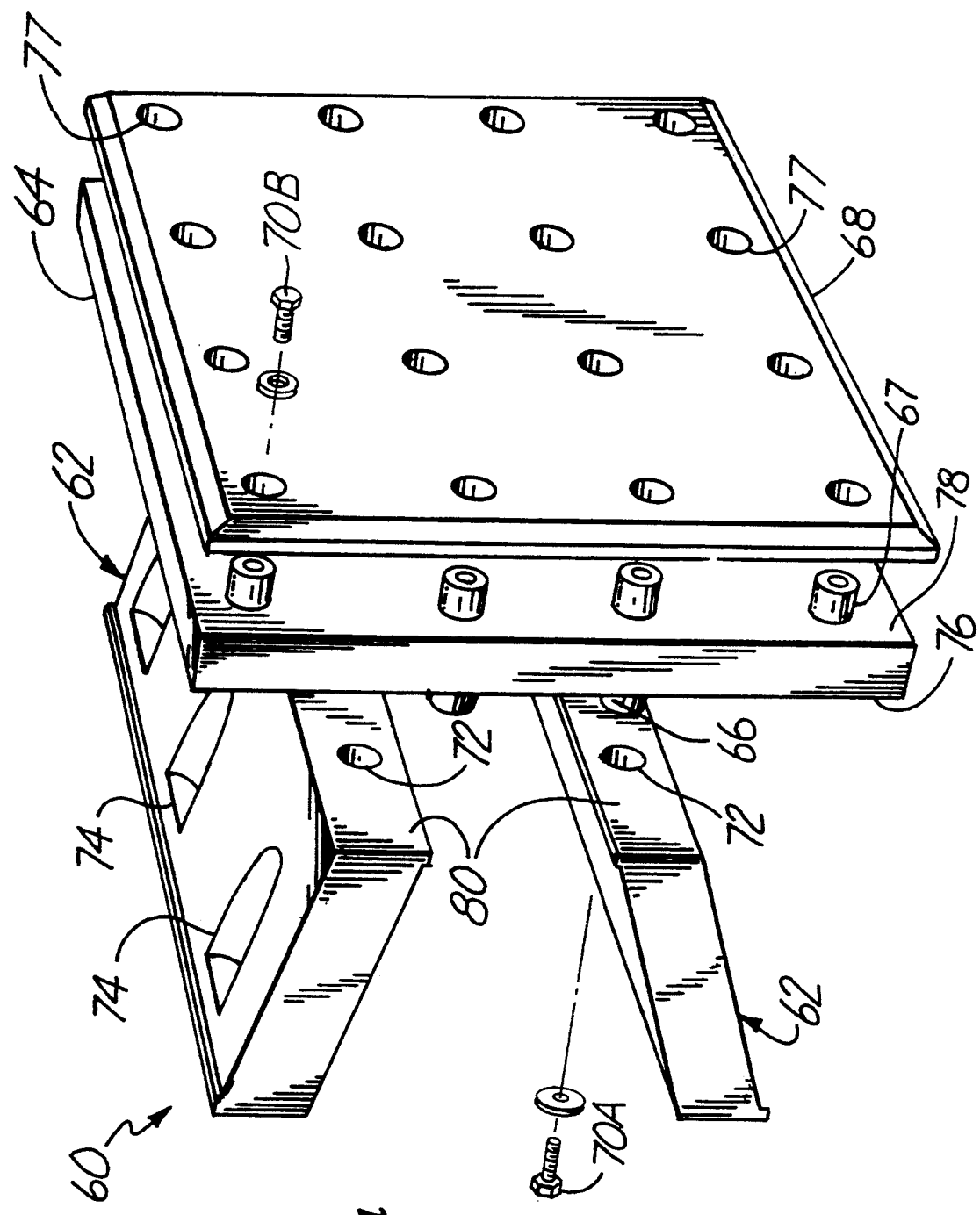
FIG. 4 is an exploded perspective view of a second embodiment of the fender of the present invention.

FIG. 4 is an exploded perspective view of a second embodiment of the present invention. Fender 60 includes absorption elements 62, back plate 64, a plurality of rear bosses 66, a plurality of front bosses 67, shielding bumper or shield 68 and a plurality of bumper attachments (bolts and retainers) 70A, 70B. Absorption elements 62 are generally parallelepipedic in shape and include a plurality of holes 72 and plurality of slots or channels 74. Absorption elements 62 are preferably formed from a wear resistant, resilient material such as rubber. Absorption elements 62 are coupled between a supporting surface such as a dock (not shown) and back plate 64. Absorption elements 62 are preferably angled towards one another so as to form a V-shaped arrangement. Absorption elements 62 absorb varying amounts of energy from back plate 64 and shield 68.

Back plate 64 is generally rectangular in shape. Back plate 64 is typically constructed from steel or other metal materials. Back plate 64 is coupled between absorption element 62 and shield 68. Back plate 64 provides a supporting structure and a surface area for absorbing energy and for transferring absorbed energy to absorption elements 62.

Rear bosses 66 protrude from a back surface 76 of back plate 64 at spaced positions along back plate 64. Front bosses 67 protrude from a front surface 78 of back plate 64 at spaced positions along back plate 64. Each boss 66, 67 can be sized independently of bumper attachment 70B to provide the most cost-effective sizing of each. Bosses 66, 67 are typically constructed from steel. However, other materials, such as plastic, may also be used to form bosses 66, 67. Back plate 64 is positioned so that back surface 76 of back plate 64 contacts front surfaces 80 of absorption elements 62 and so that rear bosses 66 are positioned in holes 72 and are surrounded by absorption elements 62.

Shield 68 preferably has the same outer dimensions as back plate 64 and includes a plurality of holes 77. Holes 76 extend from front surface of shield 68 to back surface of shield 68. Shield 68 is positioned so that back surface of shield 68 contacts front surface 78 of back plate 64 and so that front bosses 67 are positioned in holes 77 and are surrounded by shield 68. Preferably, shield 68 is constructed from an ultra-high molecular weight polyethylene material. Shield 68 absorbs energy and reduces friction and wear between back plate 64 and any colliding body. Consequently, shield 68 protects back plate 64 and prevents damage to the colliding body.

Bumper attachments 70A are positioned within slots 74 and are attached to rear bosses 66. Bumper attachments 70A hold absorption elements 62 in contact with back plate 64. Bumper attachments 70B are positioned within holes 76 and are attached to front bosses 67. Bumper attachments 70B hold shield 68 in contact with back plate 64.

Because rear bosses 66 are surrounded by absorption elements 62, absorption elements 62 absorb both vertical and horizontal shear forces. Because front bosses 67 are surrounded by shield 68, shield 68 absorbs both vertical and horizontal shear forces. As a result, front bosses 67 provide omni-directional retention of shield 68. Front bosses 67 prevent both perpendicular and parallel movement of shield 68. In addition, because front bosses 67 are positioned at spaced locations along shield 68 and because each front boss 67 is surrounded by shield 68, forces are distributed over a larger area. The array of front bosses 67 resist horizontal and vertical shear movement of shield 68. Moreover, because front bosses 67 are distributed along shield 68, fender 60 uses less material and involves less welding than fender arrangements which employ continuous rails.

Because shield 68 is typically constructed from a polyethylene, having tensile and compressive strength less than 20% those of steel, bumpers or shields made of polyethylene often fail by deforming around attaching hardware under high shear loads. To prevent this, front bosses 67 can be sized independently of the diameter of attaching hardware such as bumper attachments 70A, 70B to keep localized shear pressure within the elastic limits of polyethylene, therefore, eliminating hole distortion and potential loss of polyethylene.

Figure 5:
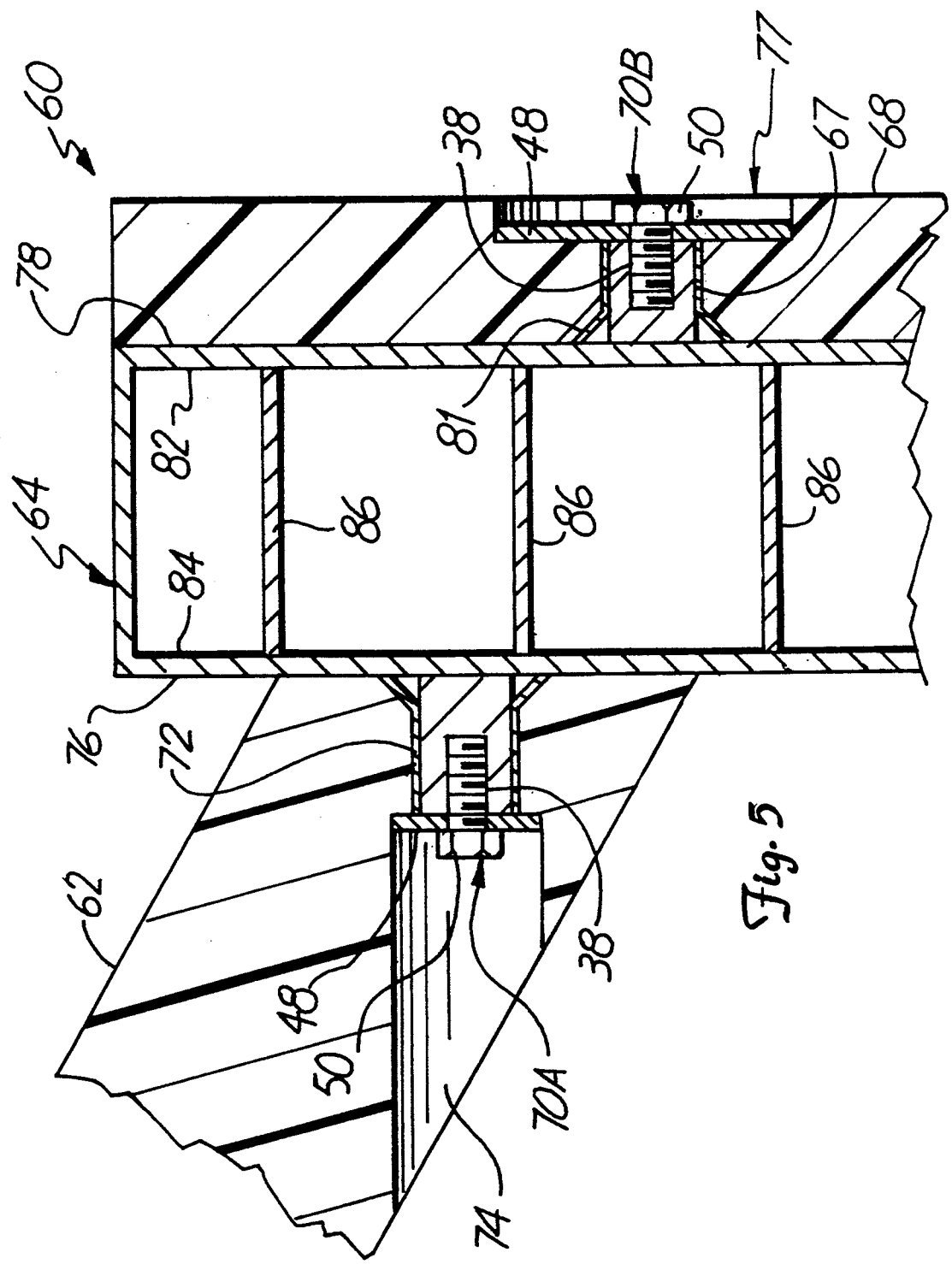
FIG. 5 is a sectional view of a portion of the fender of FIG. 4 showing bumper attachments.

FIG. 5 is an enlarged sectional view of fender 60 showing a single bumper attachment 70A mounted to rear boss 66 and a single bumper attachment 70B mounted to front boss 67, thereby holding absorption element 62 in contact with back plate 64 and holding back plate 64 in contact with shield 68. As best shown by FIG. 5, front boss 67 holds shield 68 in contact with back plate 64. Rear boss 66 holds back plate 64 in contact with absorption element 62. Rear boss 66, front boss 67 and bumper attachments 70A, 70B are similar to boss 24 and bumper attachment 28, respectively, shown in FIG. 3. Similar to boss 24 of fender 10, bosses 66 and 67 are preferably attached to back plate 64 by welds 81. Alternatively, bosses 66, 67 may be integrally formed with back plate 64 or may be fixedly attached to back plate 64 by any other suitable attachment methods as are known in the art. Shield 68 is similar to bumper 26, except that shield 68 is preferably formed from a wear resistant material such as an ultra high molecular weight polyethylene.

Back plate 64 is hollow and includes front skin 82, back skin 84 and ribs 86. Ribs 86 extend between front skin 82 and back skin 84 of back plate 64. Ribs 86 separate front skin 82 from back skin 84 and provide structural support for front surface 78 and back surface 76 of back plate 64.

As best shown by FIG. 5, slot 74 extends into absorption element 62 and communicates with hole 72 to form an upper bore through which bumper attachment 70A is positioned to engage rear boss 66.

Because rear boss 66 and front boss 67 each include an internally threaded bore 38 for engagement with bumper attachments 70A and 70B, respectively, no holes are required in back plate 64. As a result, there are no holes within back plate 64 where there is the potential for stress concentrations and corrosion.

In addition, the diameter of bosses 66, 67 can be varied independent of the diameter of attaching hardware to increase contact area between back plate 64 and absorption element 62 or shield 68. Moreover, bosses 66, 67 can be sized independently of bumper attachments 70 to provide the most cost-effective sizing of each.

Although the present invention has been described with reference to preferred embodiments, workers skilled in the art will recognize that changes may be made in form and detail without departing from the spirit and scope of the invention.

What is claimed is:

1. A resilient fender comprising:

a back plate having a front surface and a back surface;

a plurality of bosses protruding from the front surface of the back plate at spaced positions;

a bumper having a front surface, a back surface, and a plurality of holes at spaced positions, the bumper being positioned so that the back surface of the bumper contacts the front surface of the back plate and the bosses are positioned in the holes and are surrounded by the bumper;

means for holding the bumper in contact with the back plate;

a plurality of rear bosses protruding from the back surface of the back plate at spaced positions;

an absorption element having a front surface, a back surface and a plurality of holes at spaced positions, the absorption element being positioned so that the front surface of the absorption element contacts the back surface of the back plate and the rear bosses are positioned in the holes of the absorption element and are surrounded by the absorption element so that the absorption element absorbs both horizontal and vertical shear forces; and means for holding the absorption element in contact with the back plate.

2. The fender of claim 1 wherein the plurality of bosses are fixedly attached to the front surface of the back plate at spaced positions.

3. The fender of claim 2 wherein the plurality of bosses are welded to the front surface of the back plate at spaced positions.

4. The fender of claim 1 wherein the plurality of bosses are integral with the front surface of the back plate.

5. The fender of claim 1 wherein the means for holding the bumper in contact with the back plate comprise:

a plurality of retainers for contacting the bumper to hold the bumper in contact with the back plate; and means for holding the plurality of retainers in fixed relation to the back plate.

6. The fender of claim 5 wherein the means for holding the plurality of retainers in fixed relation to the back plate comprises:

an internal threaded bore in each boss; and a plurality of bolts, each bolt engaging one of the retainers and having external threads which engage the internal threaded bore of one of the bosses.

7. The fender of claim 1 wherein the means for holding the bumper in contact with the back plate comprise:

a shoulder in each hole of the bumper;

a plurality of retainers, each retainer engaging one of the shoulders and one of the bosses; and means for holding each of the retainers against one of the bosses.

8. A fender comprising:

a back plate having a front surface and a back surface;

a plurality of bosses fixedly attached to the front surface of the back plate at spaced positions, each boss having an internal threaded bore:

a bumper having a front surface, a back surface, and a plurality of holes at spaced positions, the bumper being positioned so that the back surface of the bumper contacts the front surface of the back plate and the bosses are positioned in the holes and are surrounded by the bumpers;

a plurality of retainers for contacting the bumper to hold the bumper in contact with the back plate; and a plurality of bolts, each bolt engaging one of the retainers and having external threads which engage the internal threaded bore of one of the bosses;

a plurality of rear bosses protruding from the back surface of the back plate at spaced positions:

an absorption element having a front surface, a back surface and a plurality of holes at spaced positions, the absorption element being positioned so that the front surface of the absorption element contacts the back surface of the back plate and the rear bosses are positioned in the holes of the absorption element and are surrounded by the absorption element so that the absorption element absorbs both horizontal and vertical shear forces; and means for holding the absorption element in contact with the back plate.

9. The fender of claim 8 wherein the plurality of bosses are welded to a front surface of the back plate at spaced positions.

10. A fender comprising:

a supporting surface;

a plurality of bosses protruding from the supporting surface at spaced locations, each boss having an outer perimeter and a boss surface opposite the supporting surface;

an energy absorbing member surrounding the outer perimeter of each boss so that each boss absorbs vertical and horizontal shear forces within the energy absorbing member, the energy absorbing member including a plurality of shoulders formed within the energy absorbing member and coplanar with the boss surface; and a plurality of retainers, each retainer engaging one of the shoulders and the boss surface of one of the bosses; and means for holding each of the retainers against the boss surface of one of the bosses.

11. The fender of claim 10 wherein the means for holding the bumper adjacent to the supporting surface comprise:

a plurality of retainers for contacting the energy absorbing member to hold the energy absorbing member adjacent to the supporting surface; and means for holding the plurality of retainers in fixed relation to the boss surface.

12. The fender of claim 11 wherein the means for holding the plurality of retainers in fixed relation to the boss surface comprises:

an internal threaded bore in each boss; and a plurality of bolts, each bolt engaging one of the retainers and having external threads which engage the internal threaded bore of one of the bosses.

13. The fender of claim 10 wherein the means for holding each of the retainers against one of the bosses comprises:

an internal threaded bore in each one of the bosses; and a plurality of bolts, each bolt engaging one of the retainers and having external threads which engage the internal threaded bore of one of the bosses.

14. The fender of claim 10 wherein the plurality of bosses are fixedly attached to the supporting surface at spaced locations.

15. The fender of claim 14 wherein the plurality of bosses are welded to the supporting surface at spaced locations.

16. The fender of claim 10 wherein the plurality of bosses are integral with the supporting surface.

17. The fender of claim 10 wherein the supporting surface comprises a back plate.

18. The fender comprising:

a back plate having a front surface and a back surface;

a plurality of bosses protruding from the front surface of the back plate at spaced positions;

a bumper having a front surface, a back surface, and a plurality of holes at spaced positions, the bumper being positioned so that the back surface of the bumper contacts the front surface of the back plate and the bosses are positioned in the holes and are surrounded by the bumper; and means for holding the bumper in contact with the back plate;

a plurality of rear bosses protruding from the back surface of the back plate at spaced positions;

an absorption element having a front surface, a back surface and a plurality of holes at spaced positions, the absorption element being positioned so that the front surface of the absorption element contacts the back surface of the back plate and the rear bosses are positioned in the holes of the absorption element and are surrounded by the absorption element so that the absorption element absorbs both horizontal and vertical shear forces; and means for holding the absorption element in contact with the back plate.

19. The fender of claim 18 wherein the bosses have a length less than or equal to a cross-section.

20. The fender of claim 18 wherein the bosses have a length to cross-section ratio of about 2 to 1.

* * * * *

UNITED STATES PATENT AND TRADEMARK OFFICE
CERTIFICATE OF CORRECTION

PATENT NO. : 5,361,715

DATED : November 8, 1994

INVENTOR(S) : EDWARD KIEDAISCH, DAVID L. WALLJASPER

It is certified that error appears in the above-indentified patent and that said Letters Patent is hereby corrected as shown below:

Col. 4, lines 44-45, delete "Holes 76", insert --Holes 77--

Col. 4, line 59, delete "holes 76", insert --holes 77--

Signed and Sealed this

Eleventh Day of April, 1995

Attest:

Attesting Officer

BRUCE LEHMAN

Commissioner of Patents and Trademarks